(12) United States Patent
Burns

(10) Patent No.: US 12,059,747 B1
(45) Date of Patent: Aug. 13, 2024

(54) LASER CUTTER WITH ASSIST GAS MIXER AND METHOD OF MIXING ASSIST GASES

(71) Applicant: Gregory Lee Burns, Minden, NV (US)

(72) Inventor: Gregory Lee Burns, Minden, NV (US)

( * ) Notice: Subject to any disclaimer, the term of this patent is extended or adjusted under 35 U.S.C. 154(b) by 546 days.

(21) Appl. No.: 17/084,136

(22) Filed: Oct. 29, 2020

(51) Int. Cl.
*B23K 26/12* (2014.01)
*B23K 26/38* (2014.01)

(52) U.S. Cl.
CPC .......... *B23K 26/125* (2013.01); *B23K 26/127* (2013.01); *B23K 26/38* (2013.01)

(58) Field of Classification Search
CPC .. B23K 26/123; B23K 26/125; B23K 26/127; B23K 26/38
USPC .................................................. 219/121.72
See application file for complete search history.

(56) References Cited

U.S. PATENT DOCUMENTS

| | | | | |
|---|---|---|---|---|
| 4,547,855 | A * | 10/1985 | Lanyi | B23K 26/0613 700/169 |
| 5,786,561 | A * | 7/1998 | Zefferer | B23K 26/1476 219/121.84 |
| 6,172,327 | B1 * | 1/2001 | Aleshin | B23P 6/007 219/121.84 |
| 6,313,432 | B1 * | 11/2001 | Nagata | B23K 26/14 219/121.72 |
| 6,316,743 | B1 | 11/2001 | Nagahori et al. | |
| 6,777,641 | B2 | 8/2004 | Cole, III et al. | |
| 9,511,451 | B2 | 12/2016 | Baxter et al. | |
| 10,201,878 | B2 | 2/2019 | Grapov et al. | |
| 10,576,584 | B2 * | 3/2020 | Sugiyama | B23K 26/38 |
| 10,603,745 | B2 | 3/2020 | Bea et al. | |
| 10,759,005 | B2 | 9/2020 | Hara et al. | |
| 2001/0019043 | A1 | 9/2001 | Bertez et al. | |
| 2005/0061783 | A1 * | 3/2005 | Kelley | H05H 1/30 219/121.41 |
| 2016/0107259 | A1 * | 4/2016 | Petolillo | B23K 9/16 219/121.63 |
| 2018/0369964 | A1 | 12/2018 | Grapov et al. | |
| 2019/0047088 | A1 * | 2/2019 | Riemann | B23K 26/703 |
| 2020/0254563 | A1 | 8/2020 | Grapov et al. | |

(Continued)

FOREIGN PATENT DOCUMENTS

| | | |
|---|---|---|
| CN | 107150169 | 9/2017 |
| WO | WO2017179641 | 10/2017 |

OTHER PUBLICATIONS

Cardinal Search Report re: Laser Metal Cutter; Oct. 6, 2020.

*Primary Examiner* — Dana Ross
*Assistant Examiner* — Adam M Eckardt
(74) *Attorney, Agent, or Firm* — Holland & Hart LLP

(57) ABSTRACT

A gas mixing apparatus for a laser cutter and a laser cutter including that apparatus. The mixing apparatus includes a housing defining a chamber, first and second inlet ports opening into the chamber at an obtuse angle to each other, and an outlet port. A hollow lance mounted in the first inlet port conducts a first gas into the chamber. In some embodiments, a gas sensor is in fluid communication with the chamber; and an adjustable pressure regulator is responsive to the gas sensor and is in fluid communication with the first inlet port to control the first gas as it mixes with a second gas flowing into the chamber through the second inlet port to maintain a predetermined ratio of the first gas to the second gas and thereby provide an assist gas. In some applications, a laser cutting head is in fluid communication with the output port to receive the assist gas.

29 Claims, 7 Drawing Sheets

(56) References Cited

U.S. PATENT DOCUMENTS

2020/0306892 A1* 10/2020 Hara .................. B23K 31/10
2022/0072656 A1* 3/2022 Veis .................. B23K 26/147

* cited by examiner

LASER CUTTER WITH ASSIST GAS MIXER AND METHOD OF MIXING ASSIST GASES

TECHNICAL FIELD

This invention is in the general field of laser cutters and more particularly in the field of laser cutters employing mixtures of gases as assist gases.

BACKGROUND

Laser cutting machines are used to cut metals such as steel, coated steel, and aluminum. These machines employ high-powered (3,000-10,000 watt) lasers. The laser beam generated by such a laser is focused by lenses or mirrors to a spot size as small as about 0.1 mm. The beam passes through the center of a nozzle with an opening diameter of about 3 mm. The nozzle rides only about 0.5 mm above the metal workpiece being cut. The metal is vaporized as it is being cut by the laser beam. Vaporized material must be moved out of the kerf (the cut).

An assist gas is used to accelerates movement of vaporized material out of the kerf. The assist gas is introduced into the nozzle at up to 350 PSI. While oxygen is used as the assist gas for cutting thick steel, most operations use nitrogen as the assist gas. The consumption rate of nitrogen assist gas can reach 3,000 cubic feet per hour, depending on such factors as the kind of metal being cut and its thickness.

Using a mixture of nitrogen and oxygen as the assist gas can significantly reduce the amount of gas required and can increase the cutting speed. Ratios of nitrogen to oxygen between about 95% to 5% by volume and 97% to 3% have resulted in increased cutting speeds of some types and thicknesses of steel of as much as 40%. When a user wants to switch between pure nitrogen and a nitrogen-oxygen mixture for different jobs, gas reservoirs must be purged to enable the assist gas to be provided in the necessary purity, which for some operations can be as high 99.99%.

BRIEF SUMMARY OF SOME ASPECTS OF THE SPECIFICATION

The inventor believes he has discovered at least some problems and issues with the art. Making an assist gas by a complete mixing of nitrogen and oxygen in precisely the desired proportions has been difficult. Changing the relative concentrations of these two gases in an assist gas when changing from one job to another has required a time-consuming interruption of productive use of the laser cutting machine. This has been particularly problematic when switching from a gas mixture to pure nitrogen because some jobs require nitrogen of very high purity.

Briefly and in general terms, an embodiment of a laser cutter gas mixing apparatus includes a housing defining therein a gas-tight chamber. First and second inlet ports open into the chamber. The first inlet port has a first longitudinal axis and the second inlet port has a second longitudinal axis. An obtuse angle, which in some embodiments is about 180° and in other embodiments may be between about 135° and 180°, is formed between the two axes. An outlet port opens into the chamber. The outlet port has an outlet longitudinal axis. A hollow lance mounted in the first inlet port extends into the chamber. The obtuse angle between the first and second longitudinal axes results in a gas such as oxygen flowing into the chamber through the lance in the first inlet port being directed opposite to the flow of a second gas such as nitrogen that is flowing into the chamber through the second inlet port. The resulting collision between the gases results in turbulence that ensures more thorough mixing of the two gases.

In some embodiments the housing comprises an elongated enclosure having a first end, a second end, and a six-sided exterior surface between the first and second ends. The first inlet port may be formed in the first end and the second inlet port in the second end. A sensor port may be formed in a side of the housing adjacent the first end. The outlet port may be formed in a side of the housing adjacent the second end, and in some embodiments the sensor port and the outlet port are formed in the same side of the housing.

In some embodiments the housing is about 100 mm long and each side of the housing is about 22 mm wide. The hollow lance may project halfway (that is half of the distance between the two ends) or more into the housing; in some embodiments it projects about 65 mm into the housing, which results in its open end being close to the opening of the second inlet port in the chamber. This proximity helps to achieve thorough mixing of a gas entering the chamber through the lance with another gas entering the chamber through the second inlet port.

In some embodiments, female threads of ⅛ inch NPT (National Pipe Threads) are formed in the first inlet port. Mating male threads are formed on an extremity of the hollow lance so that it can be mounted by screwing it in. In some embodiments the sensor port also has ⅛ NPT female threads to accommodate a connection to a gas sensor. The first inlet port and the outlet port may have ½ inch NPT female threads. In some embodiments, these dimensions are not critical, and other size threads or other kinds of connectors may be used for conducting first and second input gases to the chamber and for conducting the mixture of these gases as an assist gas to a laser cutting head.

The outlet longitudinal axis may form an angle of about 90° with the first longitudinal angle, or it may form a lesser angle, for example between about 60° and 90°.

An embodiment of a laser cutter includes a laser cutting head, a gas mixing apparatus as described above, the laser cutting head in fluid communication with the outlet port, and an adjustable pressure regulator in fluid-communication with the first inlet port. The adjustable pressure regulator controls a first gas flowing into the chamber through the hollow lance. The first gas mixes in the chamber with a second gas flowing into the chamber through the second inlet port. The adjustable pressure regulator is responsive to the gas sensor to maintain a predetermined volumetric ratio of the first gas to the second gas. In this way the mixture of the first and second gases is provided to the laser cutting head as an assist gas through the output port. The gas sensor may sense the assist gas through the sensor port if one is provided or through a fluid connection with the outlet port or between the outlet port and the laser cutting head.

Some embodiments include one or more of a safety valve, a first check valve, and a proportional valve in fluid-flow connection between the adjustable pressure regulator and the first inlet port; a first pressure sensor in fluid communication with the adjustable pressure regulator; a sensor bleed valve and a needle valve in fluid-flow connection between the chamber and the gas sensor; a flow meter and a second check valve in fluid communication with the second inlet port; and a second pressure sensor in fluid communication with the flow meter.

In some embodiments, the first gas comprises oxygen and the second comprises nitrogen. The ratio between them may be set between 90% nitrogen to 10% oxygen and 99% nitrogen to 1% oxygen as required for the particular job (type of metal, thickness of metal, etc.). In some embodiments the ratio may be about 97% nitrogen to 3% oxygen.

An embodiment of a method of providing an assist gas to a laser cutter begins with causing first and second gases to flow into a mixing chamber. The gases flow into each other at an obtuse angle that may be 180° or in some embodiments between about 135° and 180°. Causing them to flow into each other results in thorough mixing to form an output assist gas. A desired ratio of the amount by volume of the first gas to the amount of the second gas in the output assist gas is determined. The output assist gas is caused to flow to a laser cutting head. The ratio of the amount of the first gas to the amount of the second gas in the output assist gas is sensed, for example by measuring the concentration of the first gas in the mixing chamber. If the ratio of the amount of the first gas to the amount of the second gas in the output assist gas is less than the desired ratio, the flow of the first gas into the mixing chamber is increased, and if the ratio of the amount of the first gas to the amount of the second gas in the output assist gas is greater than the desired ratio, the flow of the first gas into the mixing chamber is reduced. This sensing and adjusting the flow of the first gas may be repeated as desired or may even be carried out continuously to assure that the assist gas contains exactly the predetermined ratio of gases.

There are other novel features and aspects that will become apparent as this Specification proceeds. A further understanding of the nature and advantages of the embodiments may be realized by reference to the following Detailed Description and the appended drawings, illustrating by example the principles of the invention. The scope of the invention, however, is to be determined solely by the claims as issued, not by whether the claimed subject matter solves any particular problem, provides any particular feature, or meets any particular object set forth in this Specification.

BRIEF DESCRIPTION OF THE DRAWINGS

The inventor's preferred and other embodiments are disclosed in association with the accompanying Figures in which.

DETAILED DESCRIPTION

Figure 1:
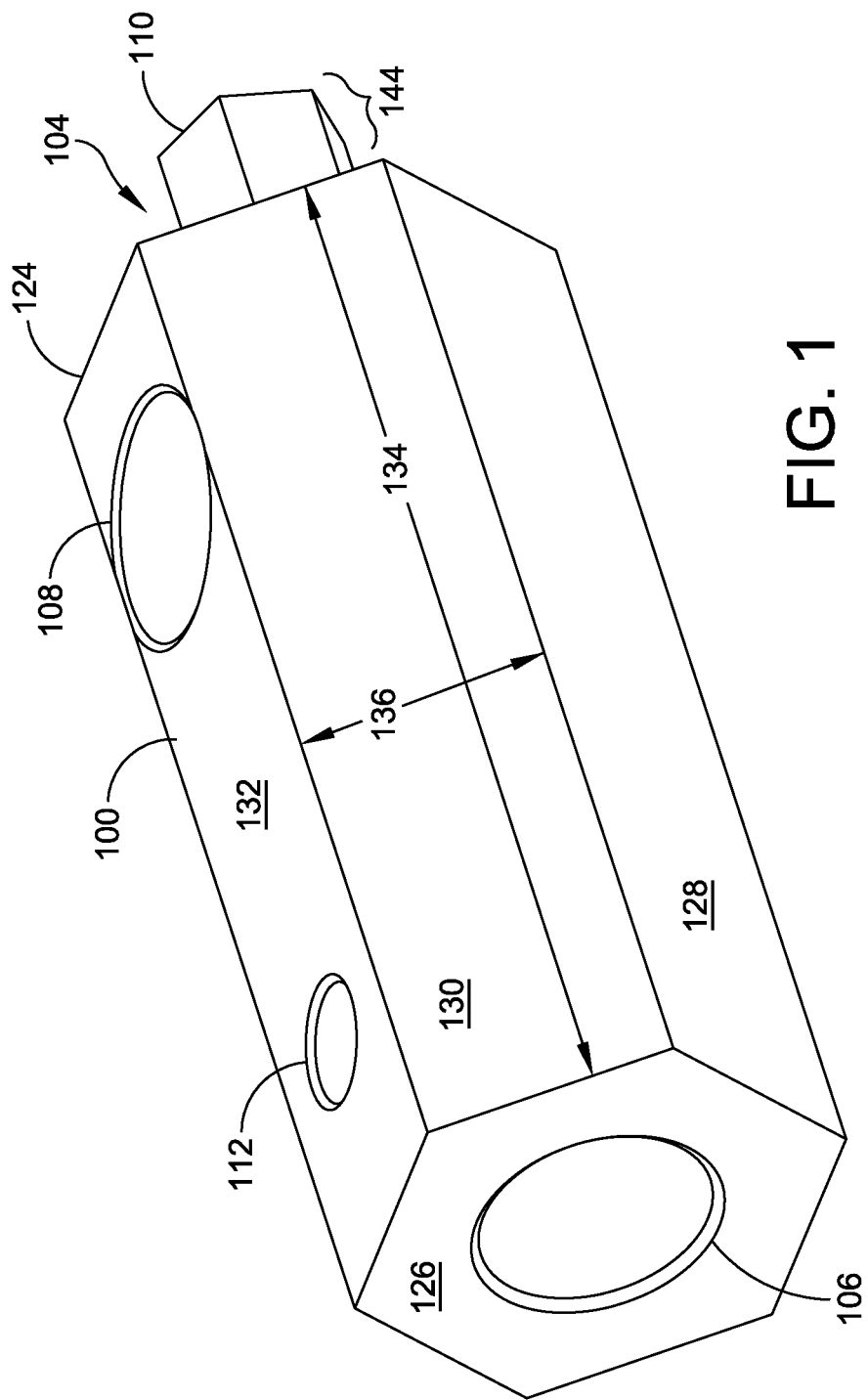
FIG. 1 is a perspective view of an embodiment of a laser cutter gas mixing apparatus.
Figure 2:
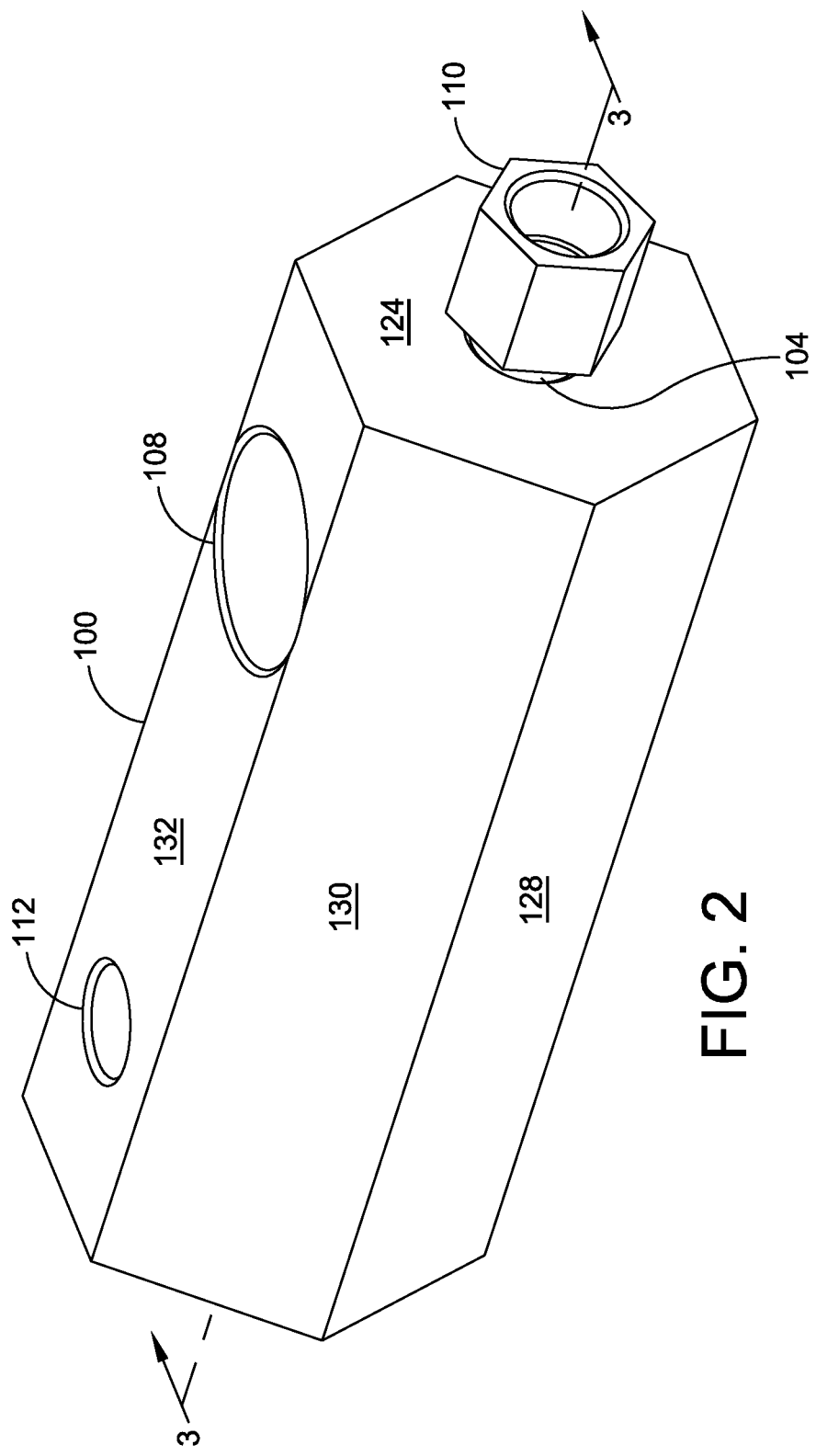
FIG. 2 is a perspective view from a different viewpoint of the apparatus of FIG. 1.
Figure 3:
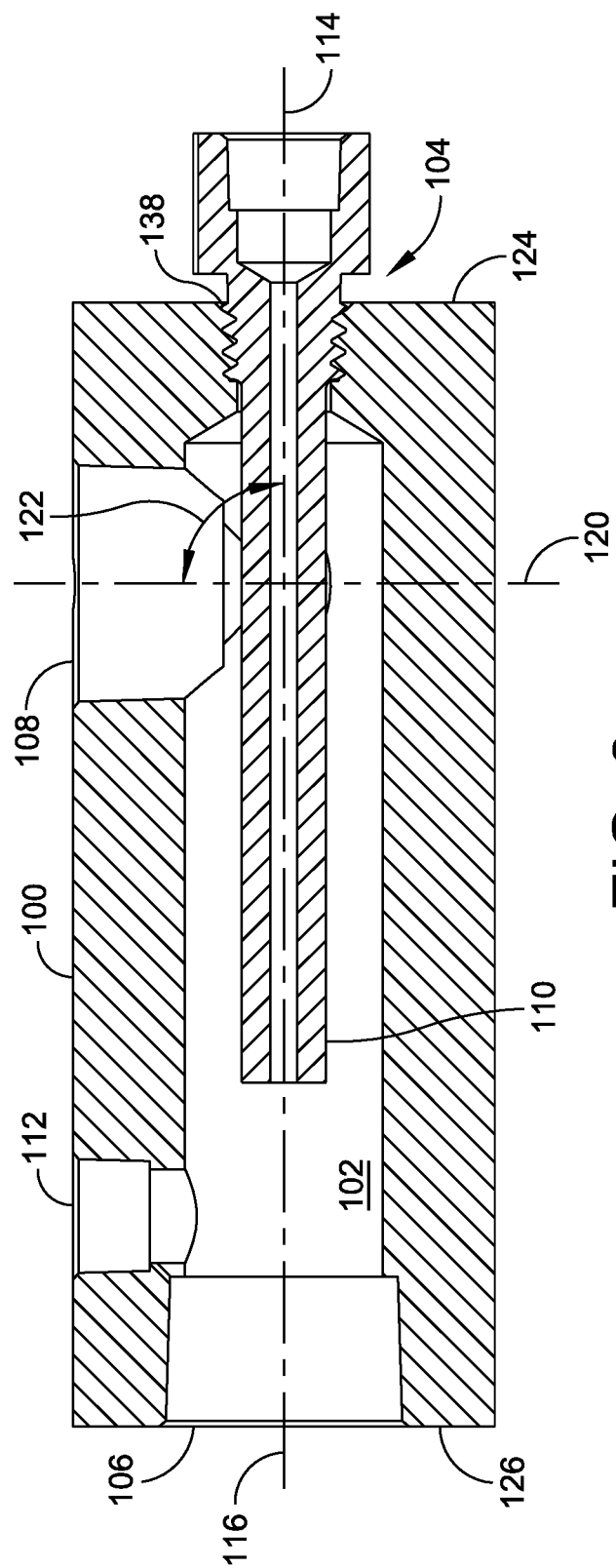
FIG. 3 is a section view taken along the line 3-3 of FIG. 2.
Figure 4:
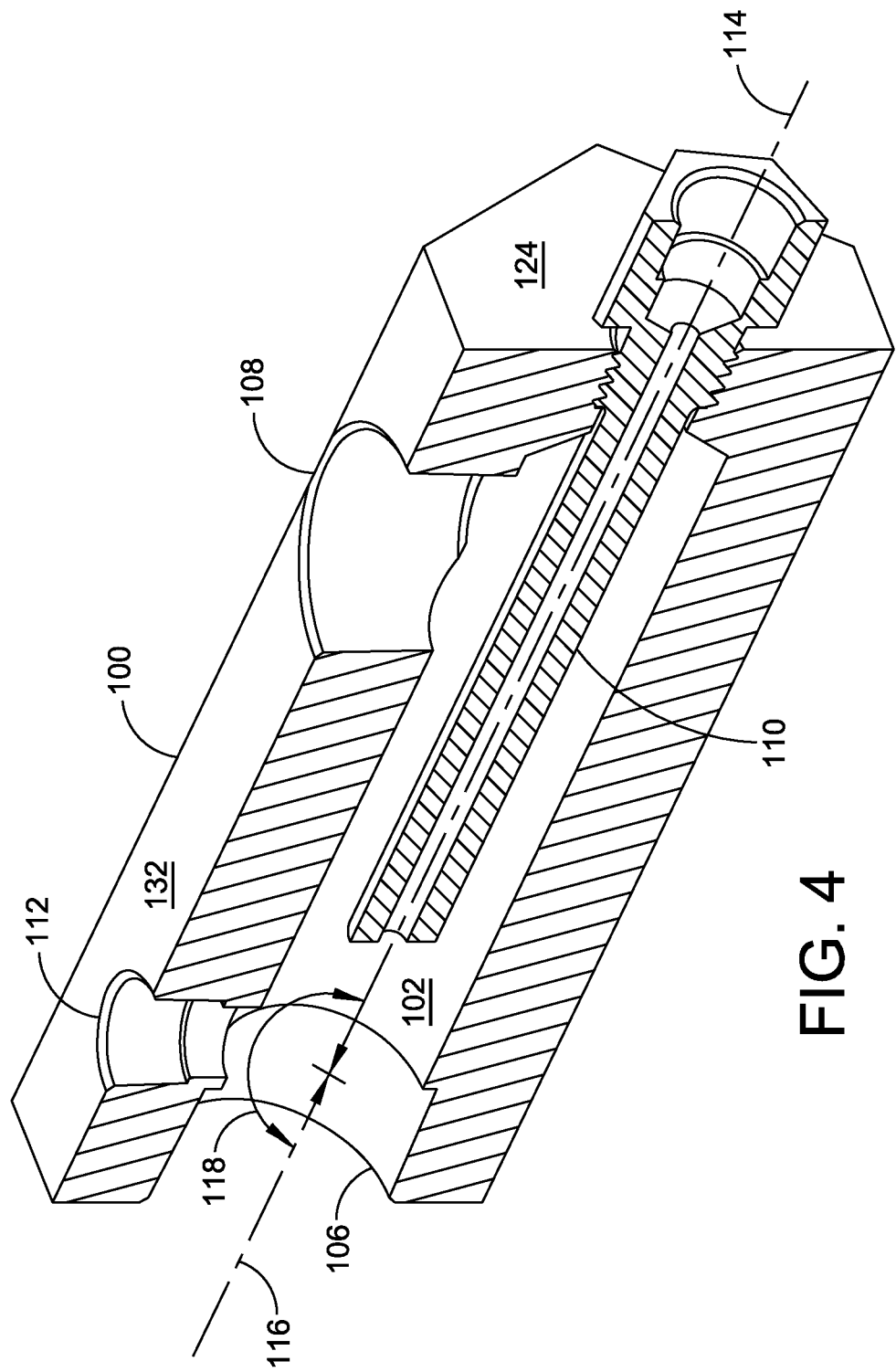
FIG. 4 is a perspective view of the section shown in FIG. 3.
Figure 5:
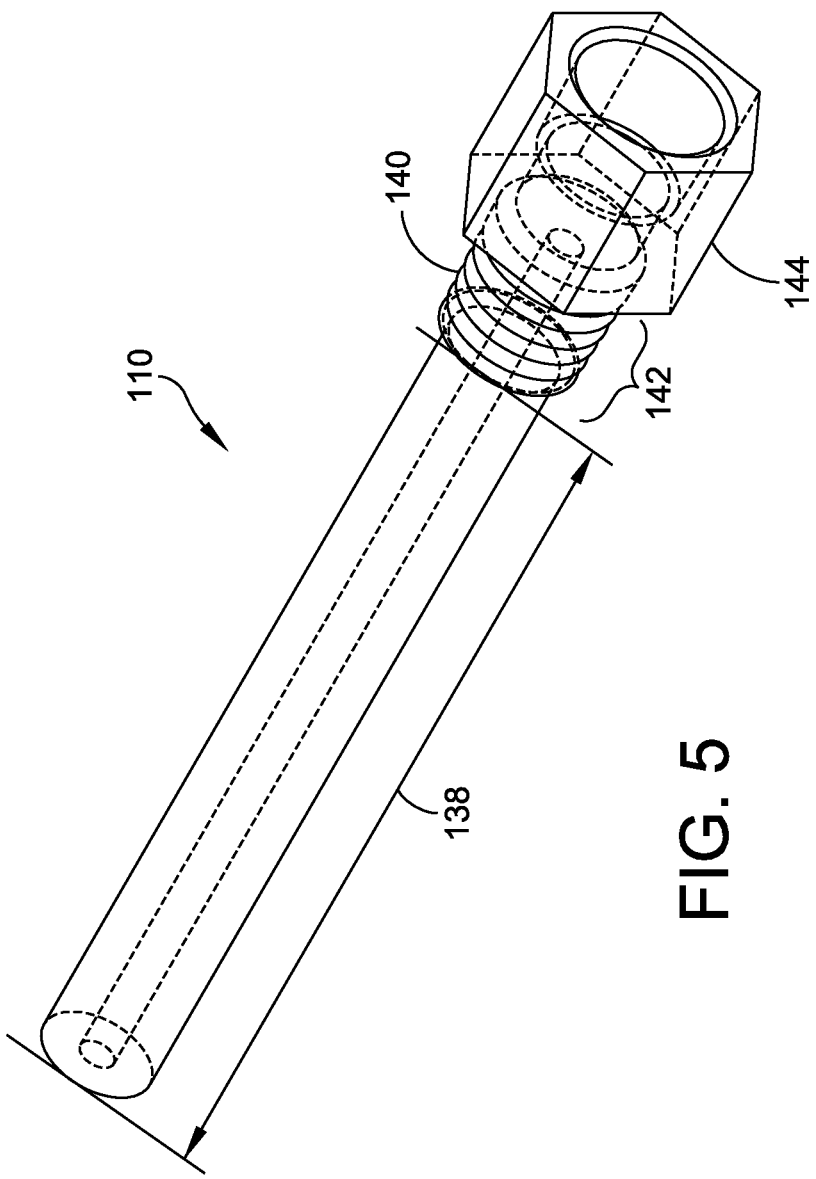
FIG. 5 is a perspective view of a hollow lance of the apparatus of FIG. 1.

Referring to FIGS. 1 through 5, an embodiment of a laser cutter gas mixing apparatus comprises a housing 100 defining therein a gas-tight chamber 102 with first and second inlet ports 104 and 106 opening into the chamber 102. An outlet port 108 opens into the chamber and a hollow lance 110 mounted in the first inlet port 104 extends into the chamber 102. In some embodiments a sensor port 112 opens into the chamber.

The first inlet port 104 has a first longitudinal axis 114 running lengthwise through the inlet port 104 and the lance 110. The second inlet port 106 has a second longitudinal axis 116 running lengthwise through the inlet port 106. The first and second longitudinal axes 114 and 116 define therebetween an obtuse angle 118. This obtuse angle in some embodiments is about 180° and in other embodiments may be between about 135° and 180°. As a result of this relative orientation of the first and second inlet ports 104 and 106, a gas such as oxygen flowing into the chamber 102 through the first inlet port 104 is directed opposite the flow of a second gas such as nitrogen that is flowing into the chamber 102 through the second inlet port 106. The resulting collision between the gases results in turbulence that ensures thorough mixing of the two gases to provide an assist gas that then exits the chamber 102 through the outlet port 108.

The outlet port 108 has an outlet longitudinal axis 120. An angle 122 is defined between the outlet axis 120 and the first axis 114. In the embodiment shown, the angle 122 is a right angle, but this is not critical, and the outlet port 108 may be oriented at some other angle with respect to either the first or second horizontal axes 114 and 116 as desired, so long as the two input gases are thoroughly mixed before they arrive at the outlet port 108.

The housing 100 in some embodiments comprises an elongated enclosure having a first end 124, a second end 126, and a six-sided exterior surface having six sides including a side 128, a side 130, and a side 132 between the first end 124 and the second end 126. The first inlet port 104 may be formed in the first end 124 and the second inlet port 106 may be formed in the second end 126. The outlet port 108 is formed in the side 132 adjacent the first end 124. The sensor port 112, if present, may be formed in the side 132 of the housing adjacent the second end 126. In some embodiments the sensor port 112 and the output port 108 may be formed in different sides.

Dimensions of the housing and the ports are not critical and may be adjusted as desired. In some embodiments the housing 100 has a length 134 of about 100 mm and each of the six sides has a width 136 of about 22 mm. The housing need not have six sides, and its exterior may be shaped as desired. The hollow lance 110 may extend from the first end 124 more than halfway between the first and second ends 124 and 126; in some embodiments the length 138 of the part of the lance that extends into the chamber is about 65 mm. The diameter of the first inlet port 104 may be about 10 mm and that of the second inlet port 106 about 20 mm. The center of the sensor port 112 may be about 19 mm from the second end 126, and the center of the output port 108 may be about 25 mm from the first end 124

Female threads 138 may be formed in the first inlet port 104. In some embodiments these threads are ⅛ NPT. Mating male threads 140 may be formed in an extremity 142 of the lance 110 for mounting of the lance in the first inlet port 104. The extremity 142 may have an end 144 that is hex-shaped for convenience in installation of the lance 110.

Female threads (not shown) may also be formed in any or all of the other ports. In some embodiments these threads are ⅛ NPT in the sensor port 108 and ½ NPT in the second inlet port 106 and the outlet port 110.

Figure 6:
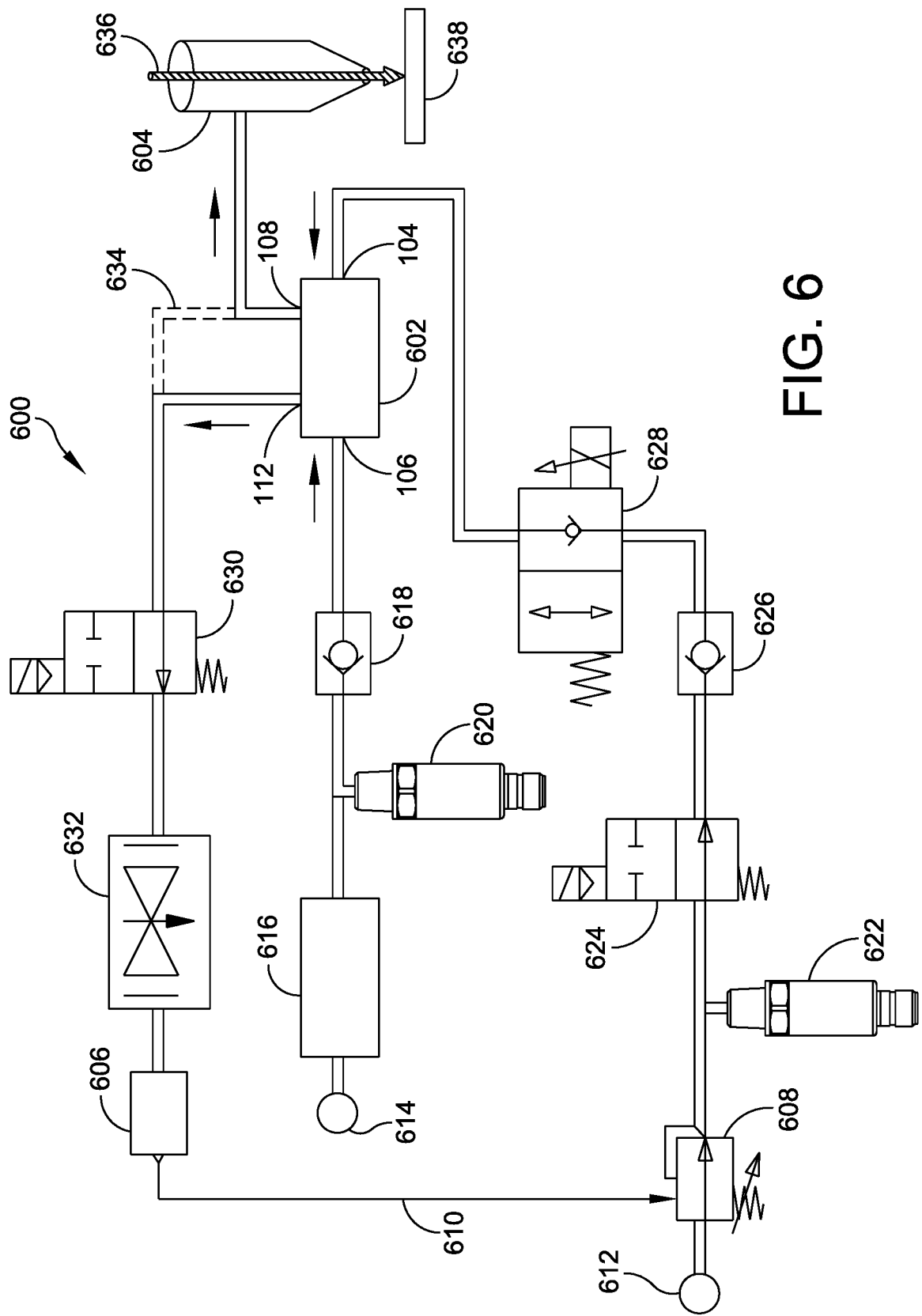
FIG. 6 is a schematic illustration of gas pipe and electrical connections in an embodiment of a laser cutter.

FIG. 6 depicts an embodiment of a laser cutter. The cutter has a gas mixing apparatus 602 similar to the mixing apparatus described above, including first and second inlet ports 104 and 106, and outlet port 108. A laser cutting head 604 is in fluid communication with the outlet port 108. A gas sensor 606 is in fluid communication with the chamber, in some embodiments through the sensor port 112. The hollow lance 110 is mounted in the first inlet port 104 and extends into the chamber. An adjustable pressure regulator 608 is responsive to the gas sensor 606 as indicated by an electronic signal line 610 to control a first gas flowing to the gas mixing apparatus 602 from a first gas source indicated as 612 to maintain a predetermined ratio in the gas mixing apparatus 602 of the first gas to a second gas flowing to the gas mixing apparatus 602 from a second gas source indicated as 614. connector 612.

In some embodiments the first gas comprises oxygen and the second gas comprises nitrogen. The rate of flow of the oxygen is controlled through the adjustable pressure regulator 608, which may be for example a fast-responding, proportioning valve that meters gas flow. The oxygen source 612 may provide the oxygen at 80 PSI or higher, and the nitrogen may be at 300-400 PSI. The nitrogen is metered with a digital flow meter 616, but otherwise flows unobstructed, in some instances through a check valve 618, to the second inlet port 106 of the mixing apparatus 602 where it is mixed with the oxygen and thence to the laser cutting head 604. A pressure sensor 620 may monitor the pressure of the nitrogen and a pressure sensor 622 may monitor the pressure of the oxygen.

The mixing apparatus 602 might be called a reverse venturi in that the oxygen is intentionally introduced into the flowing nitrogen through the hollow lance 110 in the first gas inlet port 104 like a pitot tube in order to produce turbulent mixing. The adjustable pressure regulator 610 controls the mixing rate. The gas sensor 606 may display the oxygen content of the assist gas that results from the mixing of the nitrogen and oxygen and that is provided to the laser cutting head 604.

Some embodiments include one or more of a safety valve 624, a check valve 626, and a proportional valve 628 in fluid-flow connection between the adjustable pressure regulator 610 and the first gas inlet port 104.

Some embodiments include a sensor bleed valve 630 and a needle valve 632 in fluid communication with the gas sensor 606. In the embodiments shown, the gas sensor 606 receives the assist gas from the mixing apparatus 602 through the gas sensor port 112, the sensor bleed valve 630, and the needle valve 632. In other embodiments the gas sensor 606 receives the assist gas from any convenient point between the output port 108 and the laser cutting head 604, as indicated by broken lines 634.

A laser beam 636 from a laser source (not shown) is focused, typically through one or more optical devices such as mirrors or lenses (not shown), through the laser cutting head 604 onto a workpiece 638 which may be steel, aluminum, or some other material being cut by the laser. The assist gas flows from the outlet port 108 of the mixing apparatus 602 to the laser cutting head 604 where it assists in removing vaporized material from the kerf that results from the cutting action of the laser beam.

Figure 7:
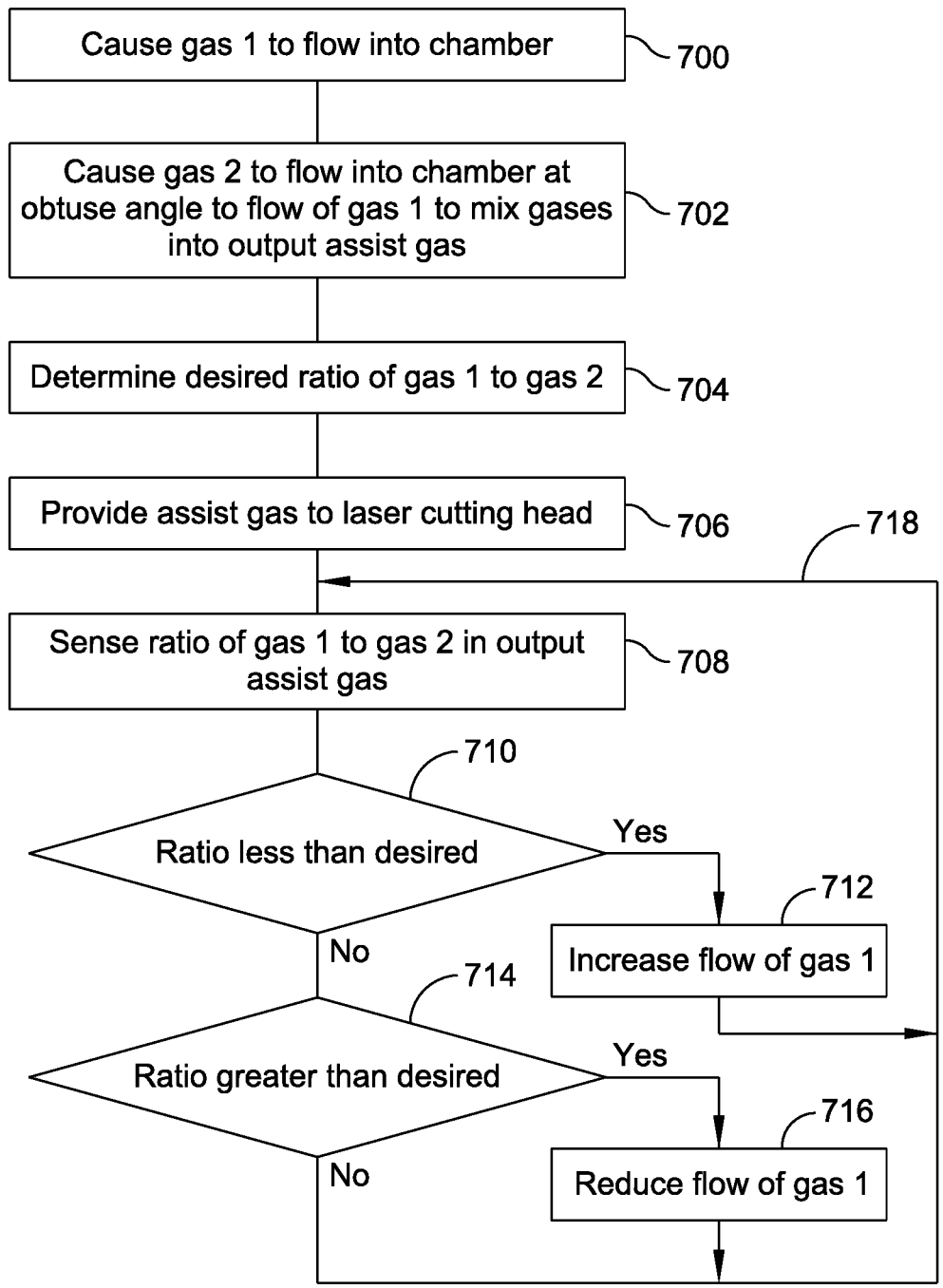
FIG. 7 is a flowchart of an embodiment of a method of providing an assist gas to a laser cutter.

As shown in FIG. 7, an embodiment of a method of providing an assist gas to a laser cutter comprises:
- (700) causing a first gas to flow into a mixing chamber;
- (702) causing a second gas to flow into the mixing chamber at an obtuse angle to the flow of the first gas whereby the first and second gases mix to form an output assist gas;
- (704) determining a desired ratio of the amount of the first gas to the amount of the second gas in the output assist gas;
- (706) causing the output assist gas to flow to a laser cutting head;
- (708) sensing the ratio of the amount of the first gas to the amount of the second gas in the output assist gas;
- (710) if the ratio of the amount of the first gas to the amount of the second gas in the output assist gas is less than the desired ratio, (712) increasing the flow of the first gas into the mixing chamber; and
- (714) if the ratio of the amount of the first gas to the amount of the second gas in the output assist gas is greater than the desired ratio, (716) reducing the flow of the first gas into the mixing chamber.

The process may end at this point, or the ratio of the gases may continue to be sensed and adjusted as indicated by a return arrow 718.

The first gas may comprise oxygen and the second, nitrogen. The ratio may be determined while the method is being carried out, or it may be predetermined. In some embodiments the ratio may be 97% nitrogen to 3% oxygen, or it may be some other value between 90% to 10% and 99% to 1%. The obtuse angle may be about 180°, in which case the gases are oppositely directed into the mixing chamber, or the angle may be between about 135° and 180°.

Example: in a test cut on mild steel, using an assist gas comprising 979% nitrogen and 3% oxygen by volume, mixed in a mixing apparatus as described above, increased cutting speed by 40% as opposed to performing the same type of cut with pure nitrogen as the assist gas.

Unless otherwise noted, the terms "a" or "an" are to be construed as meaning "at least one of". The words "including" and "having" are interchangeable with and have the same meaning as "comprising". All numbers or expressions such as those expressing dimensions, physical characteristics, and the like (except in the claims) are to be interpreted as modified by the term "approximately".

All dimensions and angles disclosed above can be varied for varying circumstances, uses, and objects. The numerical dimensions may be varied to as small as practical for a given application to as large as needed, by 1000 percent larger as but one example. Similarly, the components described and/or illustrated herein are given by way of example only and may be varied as desired.

The foregoing detailed description has described some specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to thereby enable others skilled in the art to best utilize the present systems, their components, and methods and various embodiments with various modifications as may be suited to the particular use contemplated.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The foregoing description provides examples and does not limit the scope, applicability, or configurations set forth in the claims. Changes may be made in the function and arrangement of elements discussed without departing from the scope of the disclosure. Various embodiments may omit, substitute, or add various procedures or components. For example, features described with respect to some embodiments may be combined in other embodiments. Acts, events, or functions of any of the methods described herein may be performed in a different sequence and may be added, merged, or omitted altogether.

I claim:

1. A laser cutter gas mixing apparatus comprising:
a housing comprising an elongated enclosure having a first section opposite a second section, the housing defining therein:
a gas-tight chamber;
a first inlet port opening into the chamber opposite a second inlet port opening into the chamber;
the first inlet port including a first hollow lance formed in the first section and extending along a first longitudinal axis and the second inlet port formed in the second section and having a second longitudinal axis, the first and second longitudinal axes defining therebetween an obtuse angle; and
an outlet port opening into the chamber, the outlet port having an outlet longitudinal axis; and
a gas sensor in fluid communication with the chamber.

2. The apparatus of claim 1 wherein the housing defines a gas sensor port opening into the chamber, the gas sensor being in fluid communication with the chamber through the gas sensor port.

3. The apparatus of claim 1 wherein the housing comprises a first end, a second end, and a six-sided exterior surface between the first end and the second end.

4. The apparatus of claim 1 wherein the outlet port is formed in a side of the housing adjacent the first end.

5. The apparatus of claim 1 wherein the obtuse angle is between about 135° and 180°.

6. The apparatus of claim 1 wherein the obtuse angle is about 180°.

7. The apparatus of claim 4 wherein the outlet longitudinal axis forms an angle of about 90° with the first longitudinal axis.

8. The apparatus of claim 1 wherein female threads are defined in the first inlet port and mating male threads are defined on a first extremity of the lance.

9. A laser cutter comprising:
a laser cutting head;
a gas mixing apparatus including:
a housing comprising an elongated enclosure having a first end section and a second end section and defining therein: a gas-tight chamber, a first inlet port opening in the first end section into the chamber opposite a second inlet port in the second end section opening into the chamber, the first inlet port having a first longitudinal axis, and the second inlet port having a second longitudinal axis, the first and second longitudinal axes defining therebetween an obtuse angle, and an outlet port opening into the chamber, the outlet port having an outlet longitudinal axis, the outlet port in fluid communication with the laser cutting head;
a hollow lance mounted in the first inlet port;
a gas sensor in fluid communication with the chamber; and
an adjustable pressure regulator in fluid communication with the first inlet port to control a first gas flowing into the chamber and mixing in the chamber with a second gas flowing into the chamber through the second inlet port, the adjustable pressure regulator responsive to the gas sensor to maintain a predetermined ratio of the first gas to the second gas and thereby provide at the output port an assist gas.

10. The laser cutter of claim 9 wherein the obtuse angle is about 180°.

11. The laser cutter of claim 9 and further comprising a safety valve, a first check valve, and a proportional valve in fluid-flow connection between the adjustable pressure regulator and the first inlet port.

12. The laser cutter of claim 11 and further comprising:
a first pressure sensor in fluid communication with the adjustable pressure regulator;
a sensor bleed valve and a needle valve in fluid-flow connection between the chamber and the gas sensor;
a flow meter and a second check valve in fluid communication with the second inlet port; and
a second pressure sensor in fluid communication with the flow meter.

13. The laser cutter of claim 9 wherein the first gas comprises oxygen and the second gas comprises nitrogen, and wherein the predetermined ratio is between 90% nitrogen to 10% oxygen and 99% nitrogen to 1% oxygen.

14. The laser cutter of claim 13 wherein the first gas comprises oxygen and the second gas comprises nitrogen, and wherein the predetermined ratio is about 97% nitrogen to 3% oxygen.

15. The laser cutter of claim 9 wherein the housing defines a gas sensor port opening into the chamber, the gas sensor being in fluid communication with the chamber through the gas sensor port.

16. The laser cutter of claim 9 wherein the gas sensor is in fluid communication with the output port to receive the assist gas, and the hollow lance extends into the chamber.

17. In a laser cutter of the kind having a laser cutting head adapted to receive an assist gas comprising:
a gas mixing apparatus including:
a housing comprising an elongated enclosure having a first section opposite a second section and defining therein: a gas-tight chamber, a first inlet port in the first section and opening into the chamber opposite a second inlet port in the second section and opening into the chamber and having a first longitudinal axis, the second inlet port opening into the chamber having a second longitudinal axis, the first and second longitudinal axes defining therebetween an obtuse angle, and an outlet port opening into the chamber, the outlet port having an outlet longitudinal axis;
a hollow lance mounted in the first inlet port;
a gas sensor in fluid communication with the chamber; and
an adjustable pressure regulator in fluid communication with the first inlet port to control a first gas flowing into the chamber and mixing in the chamber with a second gas flowing into the chamber through the second inlet port, the adjustable pressure regulator responsive to the gas sensor to maintain a predetermined ratio of the first gas to the second gas and thereby provide at the output port an assist gas, the laser cutting head in fluid communication the outlet port to receive the assist gas.

18. The laser cutter of claim 17 wherein the housing defines a gas sensor port opening into the chamber, the gas sensor being in fluid communication with the chamber through the gas sensor port.

19. The laser cutter of claim 17 wherein the housing comprises an elongated enclosure having a first end, a second end, and a six-sided exterior surface between the first end and the second end.

20. The laser cutter of claim 17 wherein the elongated enclosure has a first end and a second end and the first inlet port is formed in the first end, the second inlet port is formed in the second end, and the outlet port is formed in a side of the housing adjacent the first end.

21. The laser cutter of claim 20 wherein the housing defines a gas sensor port opening into the chamber and formed in a side of the housing adjacent the second end, the gas sensor being in fluid communication with the chamber through the gas sensor port.

22. The laser cutter of claim 17 wherein the obtuse angle is between about 135° and 180°.

23. The laser cutter of claim 17 wherein the obtuse angle is about 180°.

24. The laser cutter of claim 17 wherein the gas sensor is in fluid communication with the outlet port to receive the assist gas.

25. A method of providing an assist gas to a laser cutter, the method comprising, with an elongated enclosure having a first section opposite a second section and the first inlet port includes a hollow lance formed in the first section and the second inlet port is formed in the second section:
   causing a first gas to flow through the hollow lance into a mixing chamber;
   causing a second gas to flow through the second inlet port into the mixing chamber at an obtuse angle opposite to the flow of the first gas whereby the opposed first and second gas flows mix to form an output assist gas;
   determining a desired ratio of the amount of the first gas to the amount of the second gas in the output assist gas;
   causing the output assist gas to flow to a laser cutting head;
   sensing the ratio of the amount of the first gas to the amount of the second gas in the output assist gas;
   if the ratio of the amount of the first gas to the amount of the second gas in the output assist gas is less than the desired ratio, increasing the flow of the first gas into the mixing chamber; and
   if the ratio of the amount of the first gas to the amount of the second gas in the output assist gas is greater than the desired ratio, reducing the flow of the first gas into the mixing chamber.

26. The method of claim 25 wherein causing the first gas to flow into the mixing chamber comprises causing the first gas to flow through a hollow lance projecting into the interior of the mixing chamber toward the opposed second gas flow into the mixing chamber.

27. The method of claim 25 wherein the first gas comprises oxygen and the second gas comprises nitrogen, and the predetermined ratio is between 90% nitrogen to 10% oxygen and 99% nitrogen to 1% oxygen.

28. The method of claim 27 wherein the first gas comprises oxygen and the second gas comprises nitrogen, and the predetermined ratio is about 97% nitrogen to 3% oxygen.

29. The method of claim 25 wherein the obtuse angle is about 180°.

* * * * *